Sept. 27, 1966  E. J. OTKEN  3,274,958
COMESTIBLE

Filed Aug. 5, 1963  2 Sheets-Sheet 1

INVENTOR.
EDWIN J. OTKEN
BY
Brumbaugh, Free, Graves & Donohue
his ATTORNEYS

United States Patent Office 3,274,958
Patented Sept. 27, 1966

3,274,958
COMESTIBLE
Edwin J. Otken, North Brunswick, N.J., assignor to Good Humor Corporation, Brooklyn, N.Y., a corporation of Delaware
Filed Aug. 5, 1963, Ser. No. 299,968
3 Claims. (Cl. 107—54)

This invention relates to comestibles and, more particularly, to a method of making a comestible such as an "ice cream stick" having a candy core.

Comestibles having a core of candy or another confection are known in the art and are disclosed, for example, in a patent to Burt No. 1,618,324, but conventional methods of making such comestibles are so seriously deficient as to make it difficult if not impossible to produce a commercially satisfactory product. In particular, conventional methods of making such comestibles are not readily adapted to the mass production of the comestibles.

It is an object of the present invention to remedy the above-noted deficiencies of the prior art methods and, more particularly, to provide a comestible-making method which is economical and well adapted to the mass production of such comestibles and which yields a uniform product.

Broadly defined, the method of the invention comprises the steps of placing in a mold a first edible ingredient in liquid form, converting the first edible ingredient in a first region of the mold to solid form while maintaining the first edible ingredient in a second region of the mold in liquid form, placing in the second region a second edible ingredient to displace at least some of the part of the first edible ingredient remaining in liquid form from the second region, and converting the part of the first edible ingredient remaining in liquid form to solid form.

An understanding of further aspects of the invention may be obtained from a consideration of the following detailed description of two representative methods of the invention in conjunction with the accompanying drawing, in which.

Figure 1:
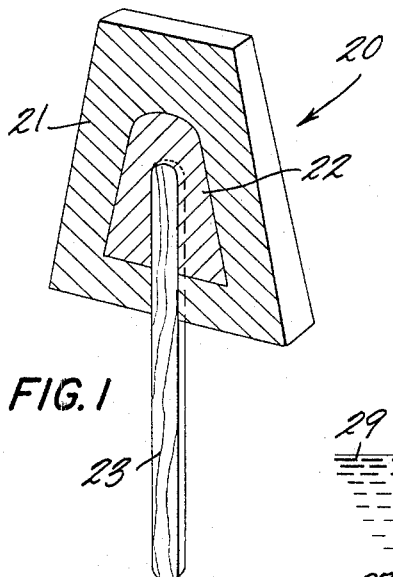
FIGURE 1 is a sectional perspective view of a comestible made in accordance with the method of the invention.

FIGURE 1 shows a comestible 20 comprising a first edible ingredient such as ice cream 21 and a second edible ingredient such as candy 22. Handle means such as a stick 23 extends into the comestible 20 and, as shown in FIGURE 1, into both the ice cream 21 and the candy 22, to facilitate handling and eating of the comestible FIGURES 2–8 illustrate succesive steps in a first representative method of making a comestible, such as that shown in FIGURE 1, in accordance with the invention.

Figure 2:
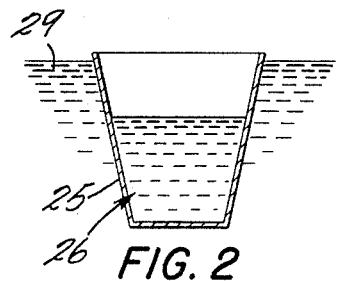
FIGURES 2–8 are a diagrammatic showing of successive steps in a first representative method of making a comestible in accordance with the invention.

FIGURE 2 illustrates the step of placing in a mold 25 a first edible ingredient such as ice cream 26 in soft, plastic, or liquid form. (The term "ice cream" as used in the specification and claims is broad enough to include not only a frozen food containing cream or butter fat but also foods such as ice milk, sherbets, and ices made with milk, water, or similar ingredients, whether such foods are frozen or unfrozen. The terms "soft," "plastic," "molten," and "liquid" as used in the specification and claims mean flowing substantially freely" and are therefore broad enough to include substances such as ice cream in the unfrozen state even though the ice cream may have solid particles such as chocolate chips therein.)

Figure 3:
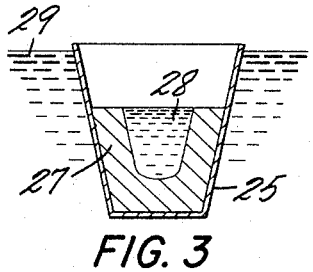

FIGURE 3 illustrates the step of converting the ice cream in a first region such as the outer region 27 to solid form while maintaining the ice cream in a second region such as the inner or center region 28 in liquid form. (The term "outer region" as used herein means the region relatively adjacent to the walls of the mold, while the term "inner region" or "center region" means the region relatively removed from the walls of the mold. Thus, all molds, even molds having unusual shapes for ice cream, such as the shape of a doughnut, have the outer and inner or center regions referred to in the present specification and claims.) Such conversion may be effected by a freezing of the ice cream in the region 27 due to the conduction of heat through the walls of the mold 25 to a heat sink such as a cold solution of brine 29. The ice cream in the outer region 27, being in greater proximity to the walls of the mold 25, cools more rapidly than the ice cream in the inner region 28 and freezes while the ice cream in the inner region is still soft, plastic, or liquid within the meaning of the term as used here.

Figure 4:
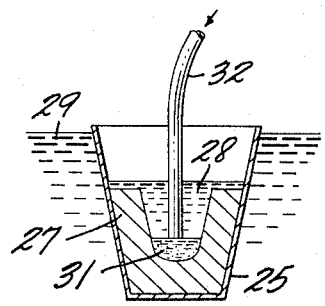
Figure 5:
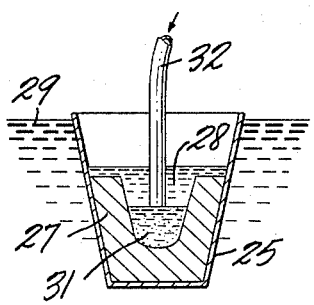

FIGURES 4 and 5 illustrate the step of placing in the center region 28 a second edible ingredient such as a candy 31, which may also be in liquid or molten form, to displace at least some of the part of the ice cream remaining in liquid form from the center region 28. The molten or liquid candy 31 may be introduced into the center region 28 by a nozzle means 32 inserted into and substantially to the bottom of the center region 28 and withdrawn upwardly as shown in FIGURE 5 at a rate substantially equal to the rate of filling of the mold 25 by the liquid candy 31.

Figure 6:
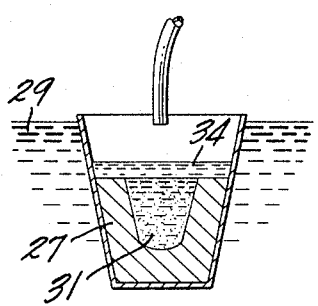
Figure 7:
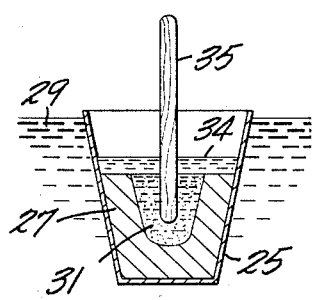

FIGURE 6 shows the mold 25 after the liquid candy 31 has been added thereto. The portion of the ice cream displaced by the liquid candy 31 forms a layer 34 of ice cream in liquid form above the liquid candy 31. The liquid candy 31 and layer of ice cream 34 constitute a liquid handle-means receiver into which a handle means such as a wooden or plastic stick 35 may be inserted, as shown in FIGURE 7.

Figure 8:
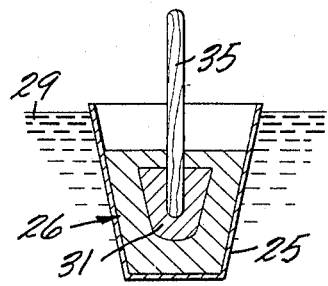

FIGURE 8 illustrates the final step of the method, namely the conversion of the liquid candy 31 and the part of the ice cream 26 remaining in liquid form to solid form by freezing in brine 29.

FIGURES 9–15 disclose a second method of making a comestible, such as that shown in FIGURE 1, in accordance with the invention.

Figure 9:
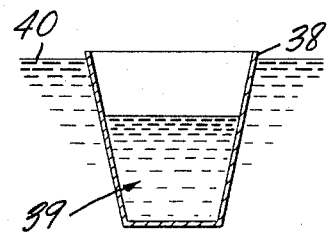
FIGURES 9–15 are a diagrammatic showing of successive steps in a second representative method of making a comestible in accordance with the invention.

FIGURE 9 shows a mold 38 in which a comestible such as ice cream 39 in liquid form is contained.

Figure 10:
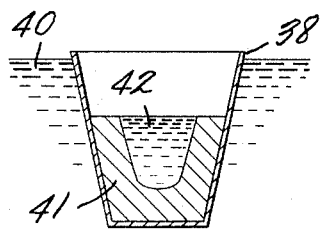
Figure 11:
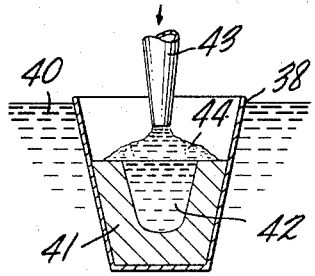

The mold 38 is cooled by means such as a solution of brine 40 until, as shown in FIGURE 10, the ice cream in a first region of the mold 38 such as the outer region 41 is frozen, the ice cream in a second region of the mold 38 such as the inner region 42 being maintained in liquid form.

A nozzle means 43 (FIGURE 11) or other suitable means discharges a confection such as candy 44, which may be molten or in liquid form, on top of the liquid ice cream in the center region 42.

Figure 12:
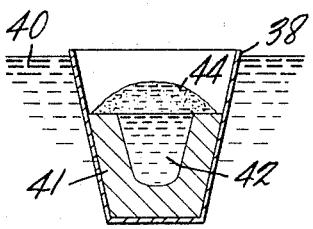
Figure 13:
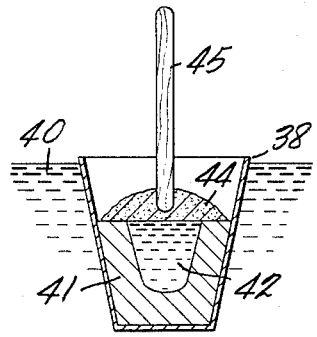

The candy 44, having a higher melting point than the ice cream 39, is readily partially hardened as shown in FIGURES 12 and 13, even though the ice cream in the region 42 is still liquid.

Figure 14:
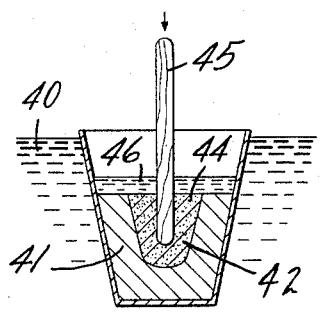

Handle means such as a wooden or plastic stick 45 is inserted therein (FIGURE 13) and employed to force the candy 44 downwardly as indicated by the arrow in FIGURE 14 to displace at least a part of the liquid ice cream 39 from the center region 42 so that it forms a layer 46 above the partially-hardened candy 44 which, as FIGURE 14 shows, now occupies at least a part of the center region 42.

Figure 15:
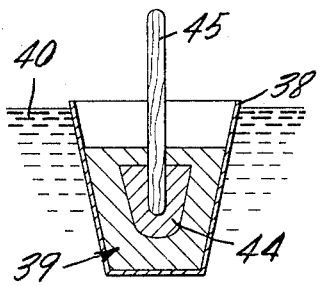

FIGURE 15 shows the step of freezing the partially-hardened candy 44 and the part of the ice cream 39 remaining in liquid form to form the end-product comestible.

Thus, there is provided in accordance with the invention a novel and highly effective method of making a comestible. The invention facilitates economical and uniform mass production of comestibles such as ice creams having cores of candy and other confections. It will be noted that for any particular mold configuration, the thickness of the frozen portion of the ice cream in the outer region adjacent the walls of the mold is determined by the rate of freezing of the ice cream, which is dependent upon the temperature of the brine solution surrounding the mold as well as the time during which the brine solution is allowed to cool the ice cream in the mold. Thus, the size of the inner unfrozen region which is displaced by the candy is controlled by the rate of freezing, while the shape of the inner unfrozen region is the same as the shape of the mold, inasmuch as the ice cream freezes uniformly from the sides of the mold. Accordingly, the size of the candy core, which always fills at least part of the unfrozen inner region, is adjusted by varying the rate of freezing, a parameter of the overall method that is easily varied.

Many modifications of the representative methods of the invention disclosed herein will occur to workmen skilled in the art. Accordingly, the invention is to be construed as including all of the methods within the scope of the appended claims.

I claim:

1. A method of making a comestible comprising the steps of placing in a mold ice cream in liquid form, converting at least some of said ice cream in the outer region of said mold to solid form while maintaining said ice cream in the center region of said mold in liquid form, inserting into and substantially to the bottom of said center region a nozzle means, dispensing through said nozzle means and into said center region a candy in liquid form to displace at least a part of said ice cream remaining in liquid form from said center region, said candy and the part of said ice cream remaining in liquid form constituting a liquid handle-means receiver, withdrawing said nozzle means upwardly from said center region at a rate substantially equal to the rate of filling thereof by said candy, inserting handle means into said liquid handle-means receiver, and converting said liquid handle-means receiver to solid form.

2. A method of making a comestible comprising the steps of placing in a mold ice cream in liquid form, converting at least some of said ice cream in the outer region of said mold to solid form while maintaining said ice cream in the center region of said mold in liquid form, placing above said center region a candy in liquid form, partially hardening said candy, inserting into said candy a handle means, forcing said handle means downwardly to move said candy into said center region and displace at least a part of said ice cream remaining in liquid form from said center region, and converting said candy and the part of said ice cream remaining in liquid form to solid form.

3. A method of making a comestible comprising the steps of placing ice cream in liquid form in a mold, converting at least some of said ice cream in the outer region of said mold to solid form while maintaining said ice cream in the center region of said mold in liquid form, inserting into said mold a nozzle means, dispensing normally solid candy in liquid form through said nozzle means and into said mold, displacing with said candy at least part of said liquid ice cream from said center region, said candy and the part of said ice cream remaining in liquid form constituting a handle-means receiver, inserting handle means into said handle-means receiver, and converting said handle-means receiver to solid form, the step of displacing with said candy at least part of said liquid ice cream and the step of inserting the handle means being in any order.

References Cited by the Examiner
UNITED STATES PATENTS

| 2,179,225 | 11/1939 | Thomas | 107—54 |
| 2,975,732 | 3/1961 | Pasquale | 107—54 |

WALTER A. SCHEEL, *Primary Examiner.*

JOSEPH SHEA, *Assistant Examiner.*